US008694983B1

(12) United States Patent
Sobel et al.

(10) Patent No.: US 8,694,983 B1
(45) Date of Patent: *Apr. 8, 2014

(54) SYSTEMS AND METHODS FOR PROVIDING GUIDANCE ON THE POTENTIAL IMPACT OF APPLICATION AND OPERATING-SYSTEM CHANGES ON A COMPUTING SYSTEM

(75) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/473,182

(22) Filed: May 16, 2012

Related U.S. Application Data

(63) Continuation of application No. 12/059,003, filed on Mar. 31, 2008, now Pat. No. 8,219,983.

(51) Int. Cl.
*G06F 9/44* (2006.01)

(52) U.S. Cl.
USPC ........... 717/168; 717/171; 717/169; 717/174; 717/176

(58) Field of Classification Search
USPC ................................................. 717/168–178
See application file for complete search history.

(56) References Cited

U.S. PATENT DOCUMENTS

| 7,269,851 | B2 | 9/2007 | Ackroyd | |
| 7,831,412 | B1 | 11/2010 | Sobel et al. | |
| 7,966,278 | B1 | 6/2011 | Satish | |
| 8,225,406 | B1 | 7/2012 | Nachenberg | |
| 8,255,902 | B1 | 8/2012 | Satish | |
| 2004/0205167 | A1 | 10/2004 | Grumann | |
| 2005/0021733 | A1 | 1/2005 | Clinton et al. | |
| 2005/0283622 | A1 | 12/2005 | Hall et al. | |
| 2005/0283831 | A1 | 12/2005 | Ryu et al. | |
| 2006/0253584 | A1 | 11/2006 | Dixon et al. | |
| 2007/0006161 | A1* | 1/2007 | Kuester et al. | 717/126 |
| 2007/0016953 | A1 | 1/2007 | Morris et al. | |
| 2007/0136297 | A1* | 6/2007 | Choe | 707/10 |
| 2007/0162458 | A1 | 7/2007 | Fasciano | |
| 2007/0300215 | A1 | 12/2007 | Bardsley | |
| 2008/0141240 | A1 | 6/2008 | Uthe | |
| 2009/0133126 | A1 | 5/2009 | Jang et al. | |
| 2009/0138856 | A1 | 5/2009 | Oja et al. | |
| 2009/0228519 | A1* | 9/2009 | Purcell et al. | 707/104.1 |
| 2013/0018727 | A1* | 1/2013 | Earles et al. | 705/14.49 |

OTHER PUBLICATIONS

Sourabh Satish; Social Trust Based Security Model; U.S. Appl. No. 11/394,846, filed Mar. 31, 2006.
Keith Newstadt et al.; Systems and Methods for Monitoring the Activity of Devices Within an Organization by Leveraging Data Generated by an Existing Security Solution Deployed Within the Organization; U.S. Appl. No. 13/291,773, filed Nov. 8, 2011.

\* cited by examiner

*Primary Examiner* — Lewis A Bullock, Jr.
*Assistant Examiner* — Tina Huynh
(74) *Attorney, Agent, or Firm* — ALG Intellectual Property, LLC

(57) ABSTRACT

A computer-implemented method for determining the impact of a software change on the health of a computing system or an application installed on the computing system may comprise identifying the software change, performing a first health evaluation, allowing the software change to occur, performing a second health evaluation, and then determining the impact of the new application by comparing the results of the second health evaluation with the results of the first health evaluation. Exemplary methods for providing guidance on the potential impact of a software change and for determining the health impact of a software change based on information obtained from a plurality of computing systems are also disclosed. Corresponding systems and computer-readable media are also disclosed.

18 Claims, 11 Drawing Sheets

First System-Health Evaluation 400

First Stability Index 402

| | |
|---|---|
| Running Average of Blue-Screen Errors | 0 |
| Running Average of Service Errors | 1 |
| Running Average of Application Errors | 1 |

404 406

First Performance Index 412

| | |
|---|---|
| Running Average of CPU Usage | 2.1875 |
| Maximum CPU Usage | 7 |
| Running Average of Page Faults | 248.4375 |
| Maximum Number of Page Faults | 844 |
| Running Average of IP Datagrams | 3.2500 |
| Maximum Number of IP Datagrams | 8 |

414 416

Second System-Health Evaluation 420

Second Stability Index 422

| | |
|---|---|
| Running Average of Blue-Screen Errors | 0 |
| Running Average of Service Errors | 2 |
| Running Average of Application Errors | 3 |

424 426

Second Performance Index 432

| | |
|---|---|
| Running Average of CPU Usage | 10.1999 |
| Maximum CPU Usage | 58 |
| Running Average of Page Faults | 960.8500 |
| Maximum Number of Page Faults | 3423 |
| Running Average of IP Datagrams | 3.2500 |
| Maximum Number of IP Datagrams | 9 |

434 436

System-Health-Impact Scores 440

Stability Impact 442

| | |
|---|---|
| Blue-Screen Errors Impact | 0% |
| Service Errors Impact | -50% |
| Application Errors Impact | -50% |

Performance Impact 446

| | |
|---|---|
| Average CPU Usage Impact | -78.5539% |
| Maximum CPU Usage Impact | -87.9130% |
| Average Page Faults Impact | -74.1440% |
| Maximum Page Faults Impact | -75.3433% |
| Average IP Datagrams Impact | 0% |
| Maximum IP Datagrams Impact | -11.1111% |

Average System-Health Impact 448

| | |
|---|---|
| Average Stability Impact | -33.3333% |
| Average Performance Impact | -55.5109% |
| Average System-Health Impact | -44.4421% |

FIG. 4

| Health-Impact Report 500 | |
|---|---|
| Applications 502 | Health Impact 506 |
| PhotoPro 1.3 | -22% |
| WebExplorer 7.2 | -03% |
| WordEdit 11.2 | -07$ |
| TuneBlaster 4.2 | -11% |
| Overall System 504 | -44% |

FIG. 5

| System Profile 600 ||
|---|---|
| Item 606 | Value 608 |
| Processor | x86 Family 6 Model 15 GenuineIntel ~ 2346 Mhz |
| Local Fixed Disk | NTFS: 120 GB (81 GB free) |
| Winsock | winsock.dll v. 3.10 (2.80 KB) |
| Physical Memory | 1.536 GB (996.45 GB free) |
| Virtual Memory | 2.00 GB (1.89 GB free) |
| Page File Space | 3.35 GB |
| Operating System | Microsoft Windows XP Professional, Version 5.1.2600, SP 2, Build 2600 |
| System Drivers | • Microsoft USB Standard Hub Driver ("usbhub"), c:\windows\system32\drivers\usbhub.sys, Kernel Driver, Manual Start Mode, Error Control Running<br>• ... |
| Signed Drivers | • Plug and Play Monitor, Signed, Monitor Class, Version 5.1.2001.0, 6/6/2001, monitor.inf, Device ID: Display\KVM2002\5&3B20608A&0&00000100&01&00<br>• ... |
| Services | • .Net Runtime Optimization Service, v2.0.50727_X86, clr_optimization_v2.0.50727_32, Manual Start Mode, c:\windows\microsoft.net\framework\v2.0.50727\mscorsvw.exe, Start Name (LocalSystem)<br>• ... |
| Program Groups | • Group Name: Accessories; Name: All Users; Accessories; User Name: All Users<br>• ... |
| Startup Programs | • PhotoPro Speed Launch, c:\progra~1\photopro\photopro~2.0\reader\reader~1.exe, All Users, Common Startup<br>• ... |
| OLE Registration | • WordPad Document, "%programfiles%\windows nt\accessories\wordpad.exe"<br>• ... |
| Internet Explorer | Version 6.0.2900.2180, Build 62900.2180, C:\Program Files\Internet Explorer, Cipher Strength: 128-bit |
| Internet Explorer File Versions | • actxprxy.dll, 6.0.2900.2180, 100 KB, 8/3/2004, 11:56:41 PM, C:\WINDOWS\system32<br>• ... |
| Internet Explorer Cache | Automatic Page Refresh, Temporary Internet Files Folder: D:\Temp\Temporary Internet Files, Total Disk Space (N/A), Available Disk Space (N/A), Maximum Cache Size (N/A), Available Cache Size (N/A) |
| Internet Explorer Objects | • SDKInstall Class, http://activex.microsoft.com/activex/controls/sdkupdate/sdkinst.cab<br>• ... |
| Internet Explorer Security Settings | My Computer (Custom), Local Intranet (Custom), Trusted Sites (Custom), Internet (Custom), Restricted Sites (Custom) |

602 encompasses: Processor, Local Fixed Disk, Winsock, Physical Memory, Virtual Memory, Page File Space 604 encompasses: Operating System through Internet Explorer Security Settings

FIG. 6

SYSTEMS AND METHODS FOR PROVIDING GUIDANCE ON THE POTENTIAL IMPACT OF APPLICATION AND OPERATING-SYSTEM CHANGES ON A COMPUTING SYSTEM

CROSS REFERENCE TO RELATED APPLICATION

This application is a continuation of U.S. application Ser. No. 12/059,003, filed 31 Mar. 2008, the disclosure of which is incorporated, in its entirety.

BACKGROUND

Operating systems, applications, and other forms of software are constantly being changed by their developers. Developers may change software for a variety of reasons, including to enhance the software or to address known problems with the software, such as security flaws or bugs. Developers typically release such changes in the form of software patches or software upgrades. Many developers rigorously test software patches and upgrades prior to release in an attempt to ensure that they adequately achieve their intended purpose without causing any new problems.

Despite such testing, a user of a computing device is typically unable to determine whether a software patch or upgrade will adversely impact the health (e.g., the performance or stability) of the computing device before installing the patch or upgrading the software. For example, a user's computing device may be significantly different from computing devices used by developers during development and testing of the software patch or upgrade, such that the patch or upgrade may impact the health of the user's device in an unexpected manner. Also, because developers may produce patches and upgrades in a relatively short period of time in order to respond to known problems (such as security flaws), developers may decide to forgo extensive testing before releasing the patch or upgrade. Developers may thus fail to discover latent defects in the patch or upgrade prior to release.

For these reasons, administrators of enterprise environments typically rigorously test software patches and upgrades before deploying the patches or upgrades. Unfortunately, computing devices within such an enterprise remain vulnerable to any problems addressed by the patch or upgrade until the administrator has completed testing of the upgrade or patch. Therefore, an administrator may be forced to decide between installing a software patch or upgrade to address a known problem in the software (thereby exposing devices within the enterprise to potentially damaging latent defects in the patch or upgrade) or extensively testing the patch or upgrade for latent defects before deployment (thereby exposing devices within the enterprise to the known software problem until testing is complete). Moreover, because many consumers lack the resources or knowledge to extensively test upgrades or patches, consumers may simply install patches or upgrades as soon as they are released, regardless of the potential negative health impact of the patch or upgrade.

SUMMARY

As will be described in greater detail below, the instant disclosure generally relates to systems and methods for providing guidance on the potential impact of a software change on the health of a computing system and/or one or more applications installed on the computing system. Systems and methods for determining the health impact of a software change based on information obtained from a plurality (potentially thousands or millions) of computing systems on which the software change has previously occurred are also disclosed.

For example, the impact a software change (such as an application or operating-system upgrade, patch, or settings change) has on the health of a computing system or an application installed on the computing system may be determined by: 1) identifying the software change, 2) performing a baseline health evaluation of the computing system or an application installed on the computing system before the software is changed, 3) allowing the software to be changed, 4) performing a second health evaluation after the software has changed, and then 5) comparing the results of the second evaluation with the results of the first evaluation to determine whether the software change impacted the health of the computing system or an application installed on the computing system. Software changes may represent either application-software changes (such as application upgrades, patches, or settings changes) or system-software changes (such as operating-system upgrades, patches, or settings changes).

The health of a system or an application installed on the system may be evaluated in a variety of ways. For example, the health of a system or application may be evaluated by evaluating the performance or stability of the system or application using various performance or stability metrics, such as the processor, memory, or network usage of the system or application or the number of errors experienced by the system or application. As will be discussed in greater detail below, the impact a software change has on the health of a system or application may be expressed by a health-impact score.

The results of each health evaluation may be compared either locally by the system itself or remotely by a backend or server. For example, a module may, after evaluating the health of a system or application both before and after the software has been changed, transmit the results of the evaluations to a backend, which backend may then remotely determine whether the software change impacted the health of the system or application by comparing the results of the evaluations. In certain embodiments, a unique identifier associated with a software change (such as a program name, version name, patch name, service pack name, name for a high-level-settings configuration, such as "Novice Mode" or "Expert Mode," or checksums or hashes of the same), may also be transmitted along with the results of the evaluations to the backend.

In one embodiment, the software change may be identified and the baseline evaluation performed before the software change takes effect on the system. Similarly, the second health evaluation may be performed before a second, subsequent software change takes place on the system in order to eliminate additional variables. The method may also comprise identifying all data, files, or system changes associated with or that result from the software change and then associating these files, data, and system changes with a single file, such as an executable file, that is associated with the software change.

As detailed above, systems and methods for determining the health impact of a software change based on information obtained from a plurality (potentially thousands or millions) of computing systems on which the software change has previously occurred are also disclosed. For example, a method for determining the health impact of a software change may comprise: 1) receiving a first set of health-impact information for a software change from a first computing system, 2) receiving a second set of health-impact information for the software change from a second computing system, and then 3) determining the health impact of the software change by comparing the first set of health-impact information with the second set of health-impact information.

The method may also further comprise: 1) receiving a request from a third computing system for the health-impact score for the software change and then 2) transmitting the health-impact score for the software change to the third computing system. In certain embodiments, the request received from the third computing system may comprise a profile of the third computing system. In this example, the potential impact of the software change on the third computing system may be determined by comparing the first set of health-impact information, the second set of health-impact information, and/or the profile of the third computing system. Upon determining the health impact of the software change on the third computing system, the server may transmit a reply to the third computing system that contains a recommendation on whether to allow the software change to occur.

In certain embodiments, the first and second sets of health-impact information may contain profiles of the first and second computing systems, respectively. In this embodiment, the health impact of the software change may be determined by comparing at least the first set of health-impact information with the second set of health-impact information to determine whether the software change is incompatible with application or system software installed on the first or second computing systems.

Systems and methods for providing guidance on the potential health impact of a software change on a computing system or an application installed on the computing system are also disclosed. For example, a method for providing such guidance may comprise: 1) identifying a software change, 2) transmitting a request for information that identifies the potential health impact of the software change to a server, 3) receiving information that identifies the potential health impact of the software change from the server, and then 4) determining, based on the information received from the server, whether to allow the software change to occur.

In certain embodiments, determining whether to allow the software change to occur may involve providing a recommendation on whether to allow the software change to occur to a user and then prompting the user to allow or deny the software change. This recommendation may be based on the information received from the server and may represent a recommendation to prevent the software change from occurring, a recommendation to allow the software change to occur, or a recommendation to allow the software change to occur conditioned upon the occurrence of an additional software change. In an additional embodiment, determining whether to allow the software change to occur may comprise automatically allowing or preventing the software change from occurring based on the information received from the server.

In some embodiments, the request transmitted by the computing system to the server may contain a profile that identifies software and/or hardware characteristics of the computing system. In this example, the recommendation on whether to allow the software change to occur may be based at least in part on a hardware or software characteristic of the computing system.

Systems and computer-readable media corresponding to the above methods are also disclosed. In addition, features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram illustrating the results of exemplary health evaluations that may be performed according to at least one embodiment.

FIG. 5 is a block diagram of a health-impact report that may be generated according to at least one embodiment.

FIG. 6 is a block diagram of a profile of a computing system that may be generated according to at least one embodiment.

Figure 1:
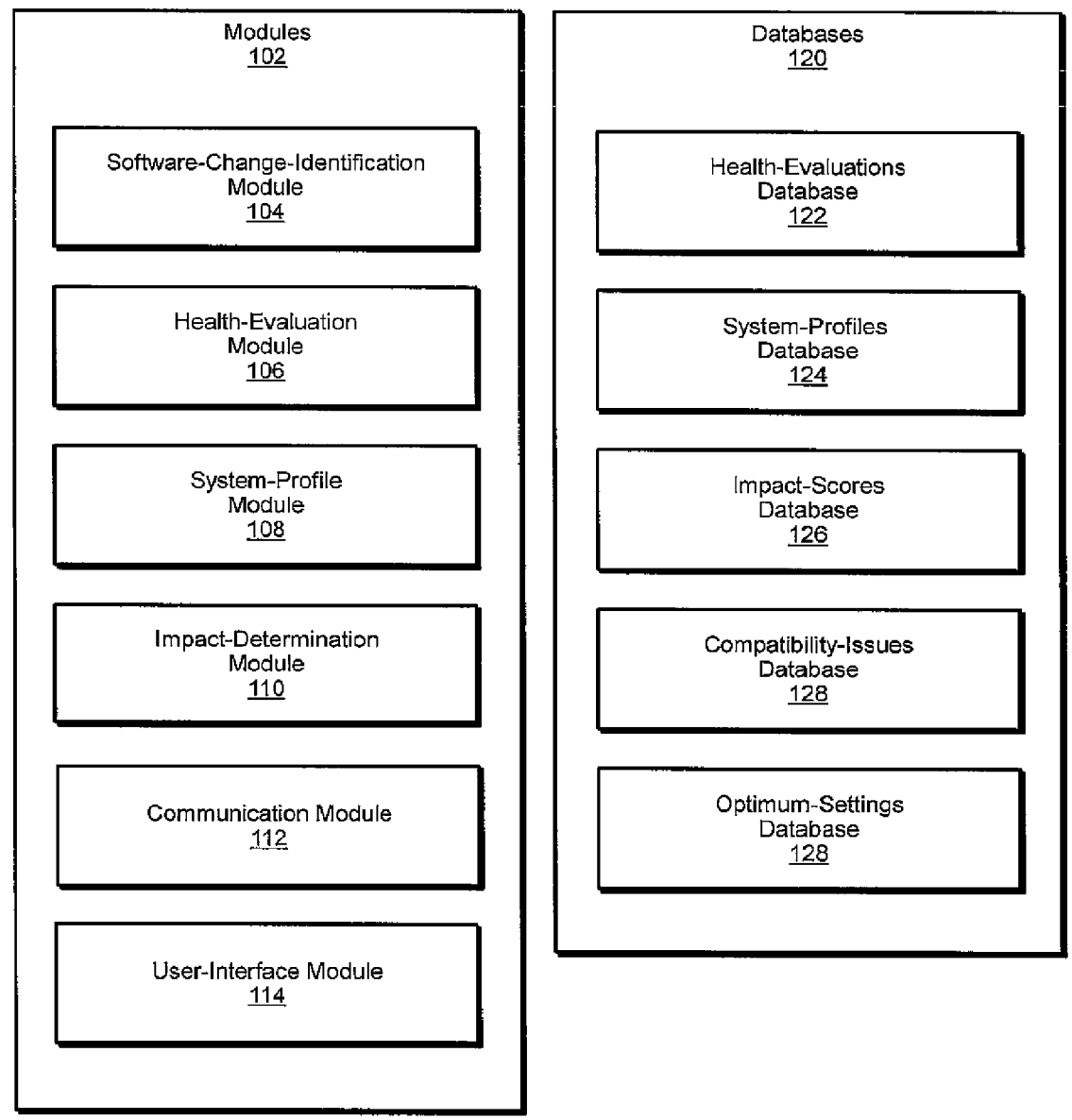
FIG. 1 is a block diagram of an exemplary system for providing guidance on the potential impact of a software change on the health of a computing system according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for providing guidance on the potential impact of a software change on the health of a computing system and/or one or more applications installed on the computing system. Systems and methods for determining the health impact of a software change based on information obtained from one or more additional computing systems on which the software change has previously occurred are also disclosed.

The phrase "software," as used herein, generally refers to any system software (such as an operating system) or application software (such as a word-processing program). In addition, the phrase "software change," as used herein, generally refers to any change made to such software (including both application software and system software). Examples of application-software changes include, without limitation, an application upgrade, an application patch, a settings change for an application, or any other change to application software. Similarly, examples of system-software changes include, without limitation, an operating-system upgrade, an operating-system patch, a settings change for an operating system, or any other system-software change. The term "health," as used herein, generally refers to the overall wellness of a computing system. As detailed below, in certain embodiments the health of a computing system and/or one or more applications installed on the computing system may be determined by evaluating the performance, stability, and/or state of security of the computing system and/or application.

Figure 2:
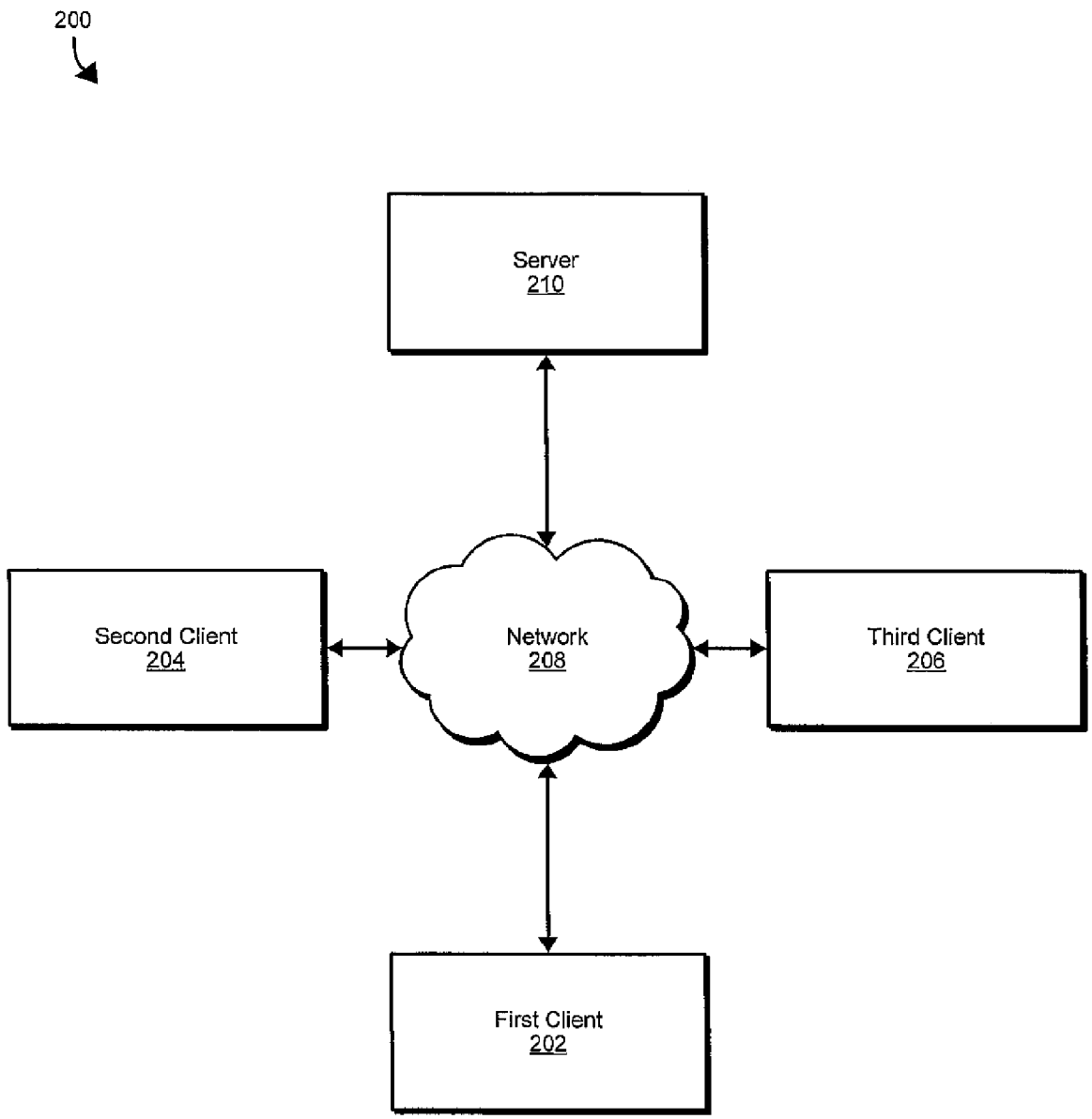
FIG. 2 is a block diagram of an exemplary network-based system for providing guidance on the potential impact of a software change on the health of a computing system according to at least one embodiment.

The following will provide, with reference to FIGS. 1 and 2, detailed descriptions of exemplary systems for: 1) determining whether a software change impacted the health of a computing system and/or application installed on the computing system, 2) determining the potential impact of a software change on the health of a computing system and/or application installed on the computing system based on information obtained from additional computing systems on which the software change has occurred, and 3) providing guidance on the potential impact of a software change on the health of a computing system or application. A description of the results of exemplary health evaluations that may be performed by such systems will be provided in connection with FIG. 4. In addition, a description of a health-impact report for a software change and a profile of a computing system that may be generated will be provided in connection with FIGS. 5 and 6, respectively. A description of a corresponding exemplary user interface for use with these systems will be provided in connection with FIG. 8. Detailed descriptions of corresponding exemplary computer-implemented methods will also be provided in connection with FIGS. 3, 7, and 9.

FIG. 1 is a block diagram of an exemplary system 100 for determining the impact of a software change on the health of a computing system and/or application installed on the computing system and for providing guidance on the potential health impact of a software change. As illustrated in this figure, exemplary system 100 may comprise one or more modules for performing one or more tasks. For example, exemplary system 100 may comprise a software-change-identification module 104 for identifying software changes on a computing system.

Exemplary system 100 may also comprise a health-evaluation module 106 for evaluating the health of a computing system and/or application installed on the computing system (hereafter "health evaluations") and an impact-determination module 110 for determining, based on these health evaluations, the impact of a software change on the health of a computing system and/or application installed on the computing system. As will be described in greater detail below, exemplary system 100 may comprise a system-profile module 108 for creating a software and/or hardware profile of a computing system. Exemplary system 100 may also comprise a communication module 112 for facilitating communication between a computing system (such as a user's system) and a server or backend and a user-interface module 114 for providing a user interface.

As illustrated in FIG. 1, exemplary system 100 may also comprise one or more databases 120. For example, exemplary system 100 may comprise a health-evaluations database 122 for storing the results of health-evaluations performed by health-evaluation module 106. Exemplary system 100 may also comprise a system-profiles database 124 for storing system profiles for one or more computing systems and an impact-scores database 126 for storing scores that represent the health impact of a software change (hereafter, "health-impact scores"). As will be described in greater detail below, health-impact scores may be calculated based on information obtained from a plurality of computing systems on which the software change has occurred.

As discussed in greater detail below, exemplary system 100 may also comprise a compatibility-issues database 128 for storing one or more compatibility issues associated with a software change. Exemplary system 100 may also comprise an optimum-settings database 130 for storing preferred or optimum application-software settings and/or system-software settings. Although illustrated as separate devices, one or more of databases 120 in FIG. 1 may represent portions of a single database or a single computing device.

In certain embodiments, one or more of modules 102 may represent one or more software applications or programs that, when executed by a computing device, may cause the computing device to perform one or more tasks required to determine the impact of a software change on the health of a computing system and/or application installed on the computing system or to provide guidance on the potential health impact of a software change. For example, as will be described in greater detail below, one or more of modules 102 may represent software modules configured to run on one or more computing devices, such as clients 202, 204, and 206 in FIG. 2, server 210 in FIG. 2, computing system 1010 in FIG. 10, and/or portions of exemplary network architecture 1100 in FIG. 11. One or more of modules 102 may also represent all or portions of one or more special-purpose computers configured to perform one or more tasks required to determine the impact of a software change on the health of a computing system or application and/or to provide guidance on the potential impact of a software change on the health of a computing system or application.

In addition, one or more of databases 120 in FIG. 1 may represent a portion of one or more computing devices. For example, one or more of databases 120 may represent a portion of clients 202, 204, and 206 in FIG. 2, server 210 in FIG. 2, exemplary computing system 1010 in FIG. 10, and/or portions of exemplary network architecture 1100 in FIG. 11. Alternatively, one or more of databases 120 may represent one or more physically separate device capable of being accessed by a computing device, such as clients 202-206 in FIG. 2, server 210 in FIG. 2, exemplary computing system 1010 in FIG. 10, and/or portions of exemplary network architecture 1100 in FIG. 11.

Exemplary system 100 in FIG. 1 may be deployed in a variety of ways. For example, all or a portion of exemplary system 100 may represent portions of a network-based system, such as exemplary network-based system 200 in FIG. 2. As illustrated in this figure, exemplary system 200 may comprise a first client 202, a second client 204, a third client 206, and a server 210, each of which may be in communication with one another via a network 208.

Clients 202-206 generally represent client-side computing devices capable of executing computer-readable instructions. In certain embodiments, clients 202-206 may comprise one or more portions of exemplary system 100 in FIG. 1. For example, one or more of modules 102 in FIG. 1 may be stored and configured to run on one or more of clients 202-206. Similarly, one or more of databases 120 in FIG. 1 may represent portions of one or more of clients 202-206 in FIG. 2.

In at least one embodiment, clients 202-206 may communicate with server 210 via network 208. Network 208 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 210. Server 210 generally represents any type or form of server-side computing device, such as a backend. In certain embodiments, server 210 may comprise one or more portions of exemplary system 100 in FIG. 1. For example, one or more of modules 102 from FIG. 1 may be stored and configured to run on server 210. Similarly, server 210 may comprise one or more of databases 120 in FIG. 1.

Figure 3:
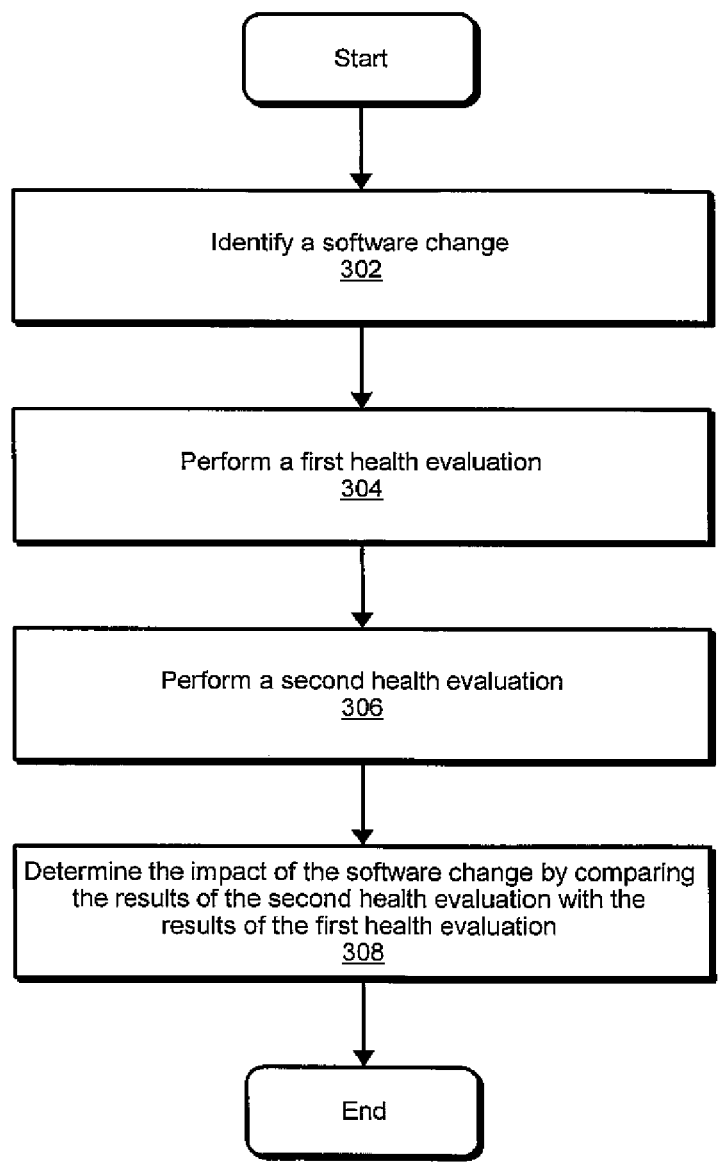
FIG. 3 is a flow diagram of an exemplary computer-implemented method for determining the impact of a software change on the health of a computing system according to at least one embodiment.

FIG. 3 is a flow diagram of an exemplary computer-implemented method 300 for determining the impact of a software change on the health of a computing system or application installed on the computing system. As detailed above, the phrase "software change" may refer to both application-software changes (such as an application upgrade, an application patch, and/or and application-settings change) and system-software changes (such as an operating-system upgrade, an operating-system patch, and/or an operating-system-setting change). As illustrated in this figure, at step 302 a software change may be identified. For example, software-change-identification module 104 in FIG. 1 may detect an application upgrade, patch, or settings change or an operating-system upgrade, patch, or settings change on first client 202 in FIG. 2.

Software changes may be identified in a variety of ways. For example, an application or operating-system upgrade or patch may be identified or detected as it is downloaded onto, loaded onto, or stored on a computing system. In this example, the upgrade or patch may be identified by detecting file replacements, version string changes, or file or version changes to any dependent component of the upgrade or patch. In an additional example, a module, such as software-change-identification module 104 in FIG. 1, may identify or detect an application or operating-system settings change initiated by a user of the computing device. For example, software-change-identification module 104 may identify changes to high-level-settings configurations (such as "Novice" or "Expert") for an application.

Software changes may be identified either prior to occurring on a computing system or shortly after occurring on a computing system. For example, software-change-identification module 104 in FIG. 1 may identify an application or operating-system upgrade or patch that is downloaded onto, stored on, or loaded onto a computing system, such as first client 202 in FIG. 2, before the upgrade or patch is fully installed on the computing system. In alternative embodiments, software-change-identification module 104 may detect a software change shortly after the software change occurs on the computing system. For example, software-change-identification module 104 may identify a change to one or more settings of a computing system's operating system or an application installed on the computing system.

In certain embodiments, software-change-identification module 104 in FIG. 1 may automatically check for software changes that are available for a computing system. For example, software-change-identification module 104 may, by communicating with one or more additional computing devices (such as a server), determine whether application or operating-system upgrades or patches are available for software installed on the computing system. In this embodiment, identifying a software change may comprise determining whether one or more software changes are available for a computing system.

In certain embodiments, identifying a software change in step 302 may comprise identifying a unique identifier for the software change. The phrase "unique identifier," as used herein, generally refers to any value or item used to identify a software change. Examples of unique identifiers include, without limitation, program names, version names, patch names, service pack names, names for high-level-settings configurations for applications (such as "Novice Mode" or "Expert Mode"), checksums or hashes of the same, and the like. Unique identifiers may be identified in a variety of ways. For example, software-change-identification module 104 in FIG. 1 may identify a unique identifier for a service pack for an operating system installed on first client 202 in FIG. 2 by identifying the name of the service pack, calculating a hash or checksum for an installer for the service pack.

In at least one embodiment, detecting a software change in step 302 may also comprise identifying all data, files, and system changes associated with, or that result from, the software change. For example, software-change-identification module 104 in FIG. 1 may detect: 1) all shared and non-shared program files created or modified by the software change, 2) all folders and directories created or modified by the software change, 3) any registry entries created or modified by the software change, 4) configuration file entries created or modified by the software change, 5) any environment variables created or modified by the software change, and/or 6) any links or shortcuts created by the software change.

In addition, in certain embodiments all data, files, and system changes associated with or that result from a software change may, after being identified, be associated with a single file, such as an executable file, associated with the software change. For example, software-change-identification module 104 in FIG. 1 may, after identifying all data, files, and system changes associated with or that result from installing version 1.3 of the application "PhotoPro," associate each of these data, files, and system changes with the installation file "PhotoPro_1.3.exe" for the application "PhotoPro 1.3." In certain embodiments, such an association may enable system 100 in FIG. 1 to accurately determine and track the impact of a single software change on the health of a computing system or application installed on the computing system, even if the software change results in the creation of numerous files or system changes.

At step 304, the current state of health of the computing system, or of one or more applications installed on the computing system, may be determined by performing a first health evaluation. As will be explained in greater detail below, this "first" health evaluation may be used as a reference or baseline health evaluation for later comparison with subsequent health evaluations to determine whether the software change identified in step 302 impacted the health of the computing system or an application installed on the computing system. The phrase "health evaluation," as used herein, generally refers to any type or form of evaluation used to determine the health of a computing system or one or more applications installed on the computing system. Examples of health evaluations include, without limitation, performance evaluations of a computing system or an application installed on a computing system (which may measure the performance of various aspects of the application or the computing system, such as memory usage, CPU usage, and page faults) and stability evaluations of an application or computing system (which may measure the stability of an application or a computing system by determining, for example, the number of errors encountered by an operating system or an application installed on the computing system).

Step 304 in FIG. 3 may be performed in a variety of ways. For example, health-evaluation module 106 in FIG. 1 may, after software-change-identification module 104 identifies a software change in step 302, perform a first evaluation of the health of one or more applications installed on first client 202 in FIG. 2 by evaluating the current stability and performance of the application(s). Additionally or alternatively, health-evaluation module 106 in FIG. 1 may perform a first evaluation of the overall system health of first client 202 in FIG. 2 by analyzing the overall stability and performance of first client 202 in FIG. 2. An illustration of the results of such an overall health evaluation is provided in FIG. 4. As illustrated in this figure, first health evaluation 400 may comprise a first stability index 402 and a first performance index 412. In certain embodiments, first stability index 402 may comprise a plurality of stability metrics 404 and results 406 for each of these metrics.

Stability metrics 404 generally represent any type or form of metric that may be used to measure the stability of a system or application. Examples of values that stability metrics may measure include, without limitation, operating-system errors (such as blue-screen errors), application errors (such as application hangs or freezes), service errors, device-driver errors, system uptime, and system reboots (such as the number of system reboots per day). In the examples provided in FIG. 4, first stability index 402 details the average number of blue-screen errors identified by health-evaluation module 106 during the evaluation period (in this case, zero), the average number of service errors identified by health-evaluation module 106 (one), and the average number of application errors identified by health-evaluation module 106 (one). In some embodiments, one or more of these errors may be caused by a conflict between the software change identified in step 302 and software installed on the system.

As with first stability index 402, first performance index 412 may comprise a plurality of performance metrics 414 and results 416 for each of these metrics. Performance metrics 414 generally represent any type or form of metric that may be used to measure the performance of an application or a computing system. Examples of values that performance metrics may measure include, without limitation, CPU usage, page faults, network usage (such as the number of IP datagrams), and memory usage. As illustrated in FIG. 4, the results 406 and 416 of stability metrics 404 and performance metrics 414 may be represented using running averages, maximum or peak values, incremental count values, or any other suitable method. In the example provided in FIG. 4, first performance index 412 details the computing system's maximum and average CPU usage during the evaluation period (in this case 7 and 2.1875, respectively), the maximum and average number of page faults experienced by the system during the evaluation period (844 and 248.4375, respectively), and the maximum and average number of IP datagrams sent and received by the system during the evaluation period (8 and 3.25, respectively).

As detailed above, the first health evaluation performed in step 304 may also evaluate the health of one or more applications installed on a computing system. In this example, first health evaluation 400 in FIG. 4 may identify, for example, the average number of errors experienced by the application during the evaluation period, the maximum and average CPU usage of the application during the evaluation period, the maximum and average number of page faults caused by the application during the evaluation period, the maximum and average number IP datagrams sent and received by the application during the evaluation period, or any other potentially useful information.

In certain embodiments, the first health evaluation detailed in step 304 may be performed before the software change identified in step 302 occurs on a computing system. For example, a first health evaluation of a computing system may be performed before an application or operating-system upgrade or patch is installed on the computing system. In alternative embodiments, this first health evaluation may be performed immediately after the software change occurs on the computing system. For example, a first evaluation of a computing system's health may be performed after software-change-identification module 104 in FIG. 1 identifies an application-setting change initiated by a user of the computing device. In at least one embodiment, the results of the first health evaluation performed in step 304 may be stored in a database, such as health-evaluations database 122 in FIG. 1.

Returning to FIG. 3, after the software change occurs, at step 306 a second health evaluation may be performed. For example, health-evaluation module 106 in FIG. 1 may, after a software change occurs on first client 202 in FIG. 2, perform a second health evaluation of first client 202 in order to determine whether the software change impacted the health of first client 202 or an application installed on first client 202. An illustration of the results of a second health evaluation 420 that may be performed by health-evaluation module 106 is provided in FIG. 4. As illustrated in this figure, second health evaluation 420 may comprise a second stability index 422 containing results 426 for a plurality of stability metrics 424 and a second performance index 432 containing results 436 for a plurality of performance metrics 434.

In the example provided in FIG. 4, second stability index 422 details the average number of blue-screen errors (zero), service errors (two), and application errors (three) identified by health-evaluation module 106 subsequent to the occurrence of the software change identified in step 302. Similarly, second performance index 432 details the computing system's maximum and average CPU usage subsequent to the software change (58 and 10.1999, respectively), the maximum and average number of page faults experienced by the system subsequent to the software change (3423 and 960.85, respectively), and the maximum and average number of IP datagrams sent and received by the system subsequent to the software change (9 and 3.25, respectively).

The second health evaluation detailed in step 306 may be performed either upon the expiration of a predetermined period of time or upon the occurrence of some specified event. For example, a second health evaluation may be performed one week after the software change occurs on the computing system. Alternatively, this second health evaluation may be performed after a second software change (i.e., a software change that is different from the software change identified in step 302) is identified. In this example, the second health evaluation may be performed either before the second software change occurs on the computing system or immediately after the second software change occurs on the computing system. In at least one embodiment, the results of this second health evaluation may be stored in a database, such as health-evaluations database 122 in FIG. 1.

Returning to FIG. 3, at step 308 the results of the second health evaluation from step 306 may be compared with the results of the first health evaluation from step 304 to determine whether the software change impacted the health of the computing system and/or one or more applications installed on the computing system. Step 308 may be performed in a variety of ways. For example, in certain embodiments impact-determination module 110 in FIG. 1 may compare the results of a first health evaluation, such as first health evaluation 400 in FIG. 4, with the results of a second health evaluation, such as second health evaluation 420 in FIG. 4, to determine whether a software change on first client 202 in FIG. 2 negatively impacted the overall health of first client 202.

Additionally or alternatively, impact-determination module 110 in FIG. 1 may compare the results of a first health evaluation with the results of a second health evaluation to determine whether a software change on first client 202 in FIG. 2 negatively impacted the health of an application (such as a word-processing application) installed on first client 202. Upon completion of step 308 in FIG. 3, exemplary method 300 may terminate.

The impact of an application on the health of a computing system or one or more applications installed on the computing system may be expressed or quantified in a variety of ways. In certain embodiments, one or more health-impact scores, such as health-impact scores 440 in FIG. 4, may be calculated based on the results of first health evaluation 400 and second health evaluation 420. As illustrated in FIG. 4, health-impact scores 440 may represent the impact a software change has on the stability (as represented by the results contained in stability-impact table 442) and performance (as represented by the results contained in performance-impact table 446) of a computing system or an application installed on the computing system. For example, the results in stability-impact table 442 may demonstrate whether there has been a percentage increase in blue-screen errors, service errors, and/or application errors subsequent to the software change. Similarly, the results in performance-impact table 446 may demonstrate whether there has been a percentage increase in CPU usage, memory usage, page faults, and/or network usage subsequent to the software change.

For example, the results contained in stability-impact table 442 in FIG. 4 demonstrate that there has been a 50% increase in the average number of service and application-related errors experienced by the system subsequent to the software change. Similarly, the results contained in performance-impact table 446 demonstrate that there has been a significant increase in average CPU usage (78.22.6%), maximum CPU usage (87.9130%), average number of page faults (74.1440%), maximum number of page faults (75.3433%), and maximum number of IP datagrams (11.1111%) subsequent to the software change.

In at least one embodiment, an average system-stability-impact score may be calculated for the software change by averaging the results contained in stability-impact table 442 (which, in the example illustrated in FIG. 4, results in an average stability-impact score of −33.3333%). Similarly, an average system-performance-impact score for the software change may be calculated by averaging the results contained in performance-impact table 446 (which, in the example illustrated in FIG. 4 results in an average performance-impact score of −55.5109%). An overall system-health-impact score for the software change may then be calculated by averaging the average-stability-impact score with the average-performance-impact score (which, in the example illustrated in FIG. 4, results in an overall system-health-impact score of −44.4421%). In at least one embodiment, one or more health-impact scores 440 in FIG. 4 may be stored in a database, such as impact-scores database 126 in FIG. 1.

As detailed above, the impact of a software change on the health of one or more applications installed on a computing system may also be evaluated by performing a first evaluation of the health of an application installed on a computing system, performing a second evaluation of the health of the application after a software change occurs on the computing system, and then determining the impact of the software change on the health of the application by comparing the results of the first health evaluation with the results of the second health evaluation. For example, health-evaluation module 106 in FIG. 1 may, after software-change-identification module 104 identifies a software change on first client 202 in FIG. 2, perform a first health evaluation of the application PhotoPro 1.3 to determine the current stability and performance of the application. After the software change occurs on first client 202, health-evaluation module 106 may perform a second health evaluation of the application PhotoPro 1.3. Impact-determination module 110 may then compare the results of the first health evaluation with the results of the second health evaluation to determine whether the software change impacted the health (e.g., the stability or performance) of the application PhotoPro 1.3.

As detailed above, the impact of a software change on the health of a computing system or one or more applications installed on the computing system may be expressed or quantified in a variety of ways. For example, health-evaluation module 106 in FIG. 1 may generate a health-impact report, such as health-impact report 500 in FIG. 5, that identifies, in percentage form, the health impact of a software change on a computing system and/or one or more applications installed on the computing system. For example, as illustrated in FIG. 5, health-impact report 500 may identify the health impact 506 of a software change on both the overall system 504 and one or more applications 502 installed on the computing system. In this example, health-impact report 500 demonstrates that there has been a 22% decrease in the health of the application PhotoPro 1.3 subsequent to the software change, a 3% decrease in the health of the application WebExplorer 7.2 subsequent to the software change, a 7% decrease in the health of the application WordEdit 11.2 subsequent to the software change, and an 11% decrease in the health of the application TuneBlaster 4.2 subsequent to the software change. Health-impact report 500 also demonstrates that there has been a 44% decrease in the overall health of the computing system subsequent to the software change. In at least one embodiment, health-impact report 500 may be stored in a database, such as health-evaluations database 122 and/or impact-scores database 126 in FIG. 1.

As detailed above, the potential impact of a software change on the health of a computing system and/or one or more applications installed on the computing system may be expressed or quantified in a variety of ways. As such, while the health evaluations and results illustrated in FIGS. 4 and 5 have been described with a certain degree of particularity, the potential impact of a software change on the health of a computing system and/or one or more applications installed on the computing system may be calculated using any number of additional heuristics, formulas, or methods.

In addition, one or more of steps 302-308 in FIG. 3 may be performed by a local system (such as clients 202-206 in FIG. 2 and/or computing system 1010 in FIG. 10), by a remote system (such as server 210 in FIG. 2 and/or portions of exemplary network architecture 1100 in FIG. 11), or any combination thereof. For example, a local system, such as first client 202 in FIG. 2 and/or computing system 1010 in FIG. 10, may determine the impact of a software change on the health of a computing system or an application installed on the computing system in step 308 by comparing the results of the first health evaluation in step 304 with the results of the second health evaluation performed in step 306. Alternatively, a remote computing device, such as server 210 in FIG.

Figure 11:
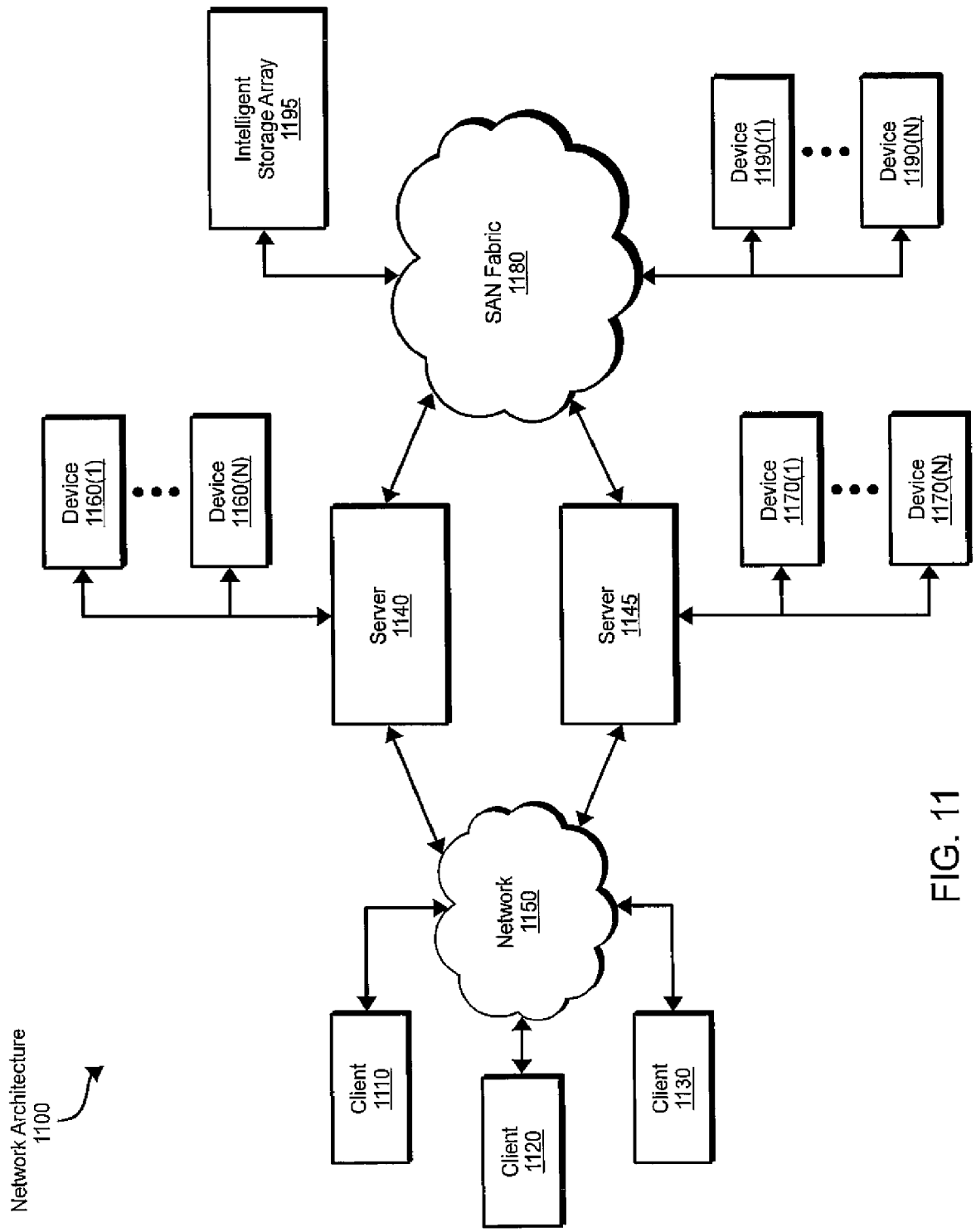
FIG. 11 is a block diagram of an exemplary computing network capable of implementing one or more of the embodiments described and/or illustrated herein.

2 and/or portions of exemplary network architecture 1100 in FIG. 11, may determine the impact of a software change on the health of a computing system or an application installed on the computing system in step 308 by comparing the results of the first health evaluation performed in step 304 with the results of the second health evaluation performed in step 306.

For example, the results of both health evaluations (i.e., the first health evaluation performed in step 304 and the second health evaluation performed in step 306) may be transmitted, along with a unique identifier for the software change, to a server or a backend. For example, communication module 112 in FIG. 1 may cause first client 202 in FIG. 2 to transmit the results of the first and second health evaluations, along with a checksum or hash calculated for an installer for an operating-system service pack (which may be used, as detailed above, to identify the service pack), to server 210 in FIG. 2. In at least one embodiment, the results of these health evaluations may be stored in a database, such as health-evaluations database 122 in FIG. 1.

Server 210 may then determine whether the service pack impacted the health of the computing system or one or more applications installed on the computing system by comparing the results of the second health evaluation with the results of the first health evaluation. For example, impact-determination module 110 in FIG. 1 may cause server 210 in FIG. 2 to calculate one or more health-impact scores, such as health-impact scores 440 in FIG. 4, for the service pack by comparing the results from the first health evaluation in step 304 with the results of the second health evaluation from step 306. Server 210 may then store the resulting health-impact score or scores in a database, such as impact-scores database 126 in FIG. 1.

Although not illustrated in FIG. 3, in certain embodiments exemplary method 300 may also comprise creating a profile of the computing system. For example, system-profile module 108 in FIG. 1 may create a profile of first client 202 in FIG. 2. The phrase "profile," as used herein, generally refers to any data structure that identifies at least one characteristic of a computing system. In certain embodiments, this profile may identify one or more software or hardware characteristics of the computing system. FIG. 6 provides an illustration of such a profile. As illustrated in this figure, a system profile 600 of a computing device may comprise a hardware profile 602 that identifies one or more hardware characteristics of the computing system and a software profile 604 that identifies one or more software characteristics (including characteristics of both application software and system software) of the computing system. Any number of software or hardware characteristics of a computing system may be identified in a system profile. Examples of hardware characteristics that may be identified include, without limitation, the characteristics of one or more processors of a computing system, the characteristics of one or more remote or local discs of a computing system, the characteristics of physical or virtual memory of a computing system, the page-file space of a computing system, or any other potentially useful information.

Similarly, software profile 604 may identify the characteristics of application software or system software installed on the computing system. Examples of software characteristics that may be contained within software profile 604 include, without limitation, operating-system information, service-pack information, driver information, Internet-browser information, security-settings information, application information, or any other potentially useful information.

A profile of a computing system may be generated or created in a variety of ways. For example, in WINDOWS systems, the command MSINFO32.exe may be used to generate a report that identifies one or more software or hardware characteristics of a computing system. In this example, unnecessary or duplicative information may be removed from such a report prior to storing the report as a profile.

In certain embodiments, the profile of the computing system may be transmitted to a server or a backend. For example, communication module 112 in FIG. 1 may, after system-profile module 108 creates a profile of first client 202 in FIG. 2, transmit the profile of first client 202 to server 210 via network 208. Server 210 may then store this profile in a database, such as system-profiles database 124 in FIG. 1. Computing-system profiles may be generated and/or transmitted to a server upon the expiration of a predetermined period of time or upon the occurrence of a specified event. For example, system-profile module 108 in FIG. 1 may generate a profile of first client 202 in FIG. 2 when a software change is identified in step 302 in FIG. 3, when a first health evaluation is performed in step 304, and/or when a second evaluation is performed in step 306. The profile may then be transmitted either individually or along with the results of the first health evaluation or the second health evaluation to the server. As will be described in greater detail below, a profile of a computing system may be used to determine the impact of a software change on specific aspects of a computing system, such as applications installed on a computing system.

Figure 7:
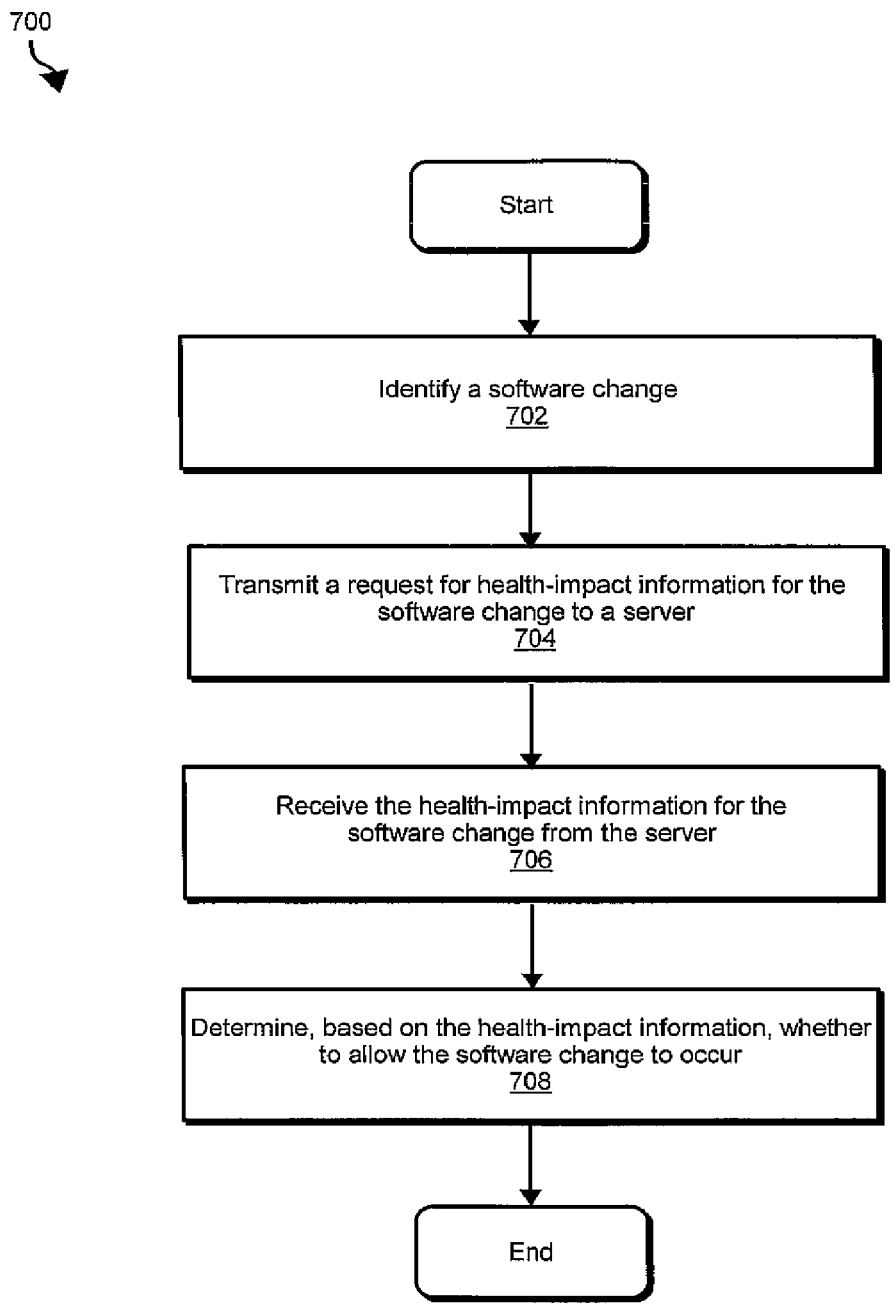
FIG. 7 is a flow diagram of an exemplary computer-implemented method for determining the potential impact of a software change on the health of a computing system according to an additional embodiment.

As detailed above, embodiments of the instant disclosure may provide guidance on the potential impact of a software change on the health of a computing system and/or an application installed on the computing system. FIG. 7 is a flow diagram of an exemplary computer-implemented method 700 for determining the potential impact of a software change on the health of a computing system and/or an application installed on the computing system. As illustrated in this figure, at step 702 a software change may be identified. As detailed above, this software change may represent an application-software change (such as an application upgrade, an application patch, a settings change for an application, or the like) or a system-software change (such as a patch for an operating system, an upgrade for an operating system, a service pack for an operating system, a settings change for an operating system, or the like). For example, software-change-identification module 104 in FIG. 1 may identify a patch or a service pack for an operating system installed on first client 202 in FIG. 2.

At step 704, a request for health-impact information for the software change identified in step 702 may be transmitted to a server. For example, communication module 112 in FIG. 1 may, after software-change-identification module 104 in FIG. 1 identifies a software change for first client 202 in FIG. 2, transmit a request for health-impact information for the software change to server 210 in FIG. 2 via network 208. In at least one embodiment, this request may contain a unique identifier associated with the software change (such as the name of a service pack) and/or a profile of the computing system.

At step 706, health-impact information for the software change may be received from a server or backend. The phrase "health-impact information" may refer to any information that may be used to determine the potential impact of a software change on the health of a computing system and/or one or more applications installed on the computing system. Examples of health-impact information include, without limitation, an overall health-impact score for the software change (which, as detailed above, may be based on health-impact information obtained from a plurality of computing systems), an application specific health-impact score for the software change (which may be based on health-impact information obtained from a plurality of additional computing systems), or any other potentially useful information. Health-impact information for a software change may be received from a server in a variety of ways. For example, communication module 112 in FIG. 1 operating on first client 202 in FIG. 2 may receive health-impact information for a software change from server 210 in FIG. 2 via network 208.

At step 708, the system may determine, based on the health-impact information received from the server, whether to allow the software change to occur. Step 708 may be performed in a variety of ways. In one embodiment, determining whether to allow the software change to occur may comprise providing a recommendation on whether to allow the software change to occur to a user and then prompting the user to allow or deny the software change. In certain embodiments, this recommendation may comprise a recommendation to prevent the software change from occurring, a recommendation to allow the software change to occur, and/or a recommendation to allow the software change to occur conditioned upon the occurrence of an additional software change. For example, impact-determination module 110 in FIG. 1 may recommend that a user avoid upgrading the application "PhotoPro 1.3" to version 1.5 due to performance and stability issues associated with this version of the application identified on additional computing systems. Alternatively, impact-determination module 110 may recommend that a user upgrade the application "PhotoPro 1.3" to version 1.5 due to performance and stability issues identified with this application on additional computing systems.

Similarly, impact-determination module 110 may recommend that a user allow a software change to occur only if an additional software change also occurs. For example, impact-determination module 110 in FIG. 1 may recommend that a user install a service pack for an operating system on the user's computing device only if the program "WebExplorer 7.2" is upgraded to version 8.0 due to compatibility issues identified between this service pack and version 7.2 of WebExplorer.

Figure 8:
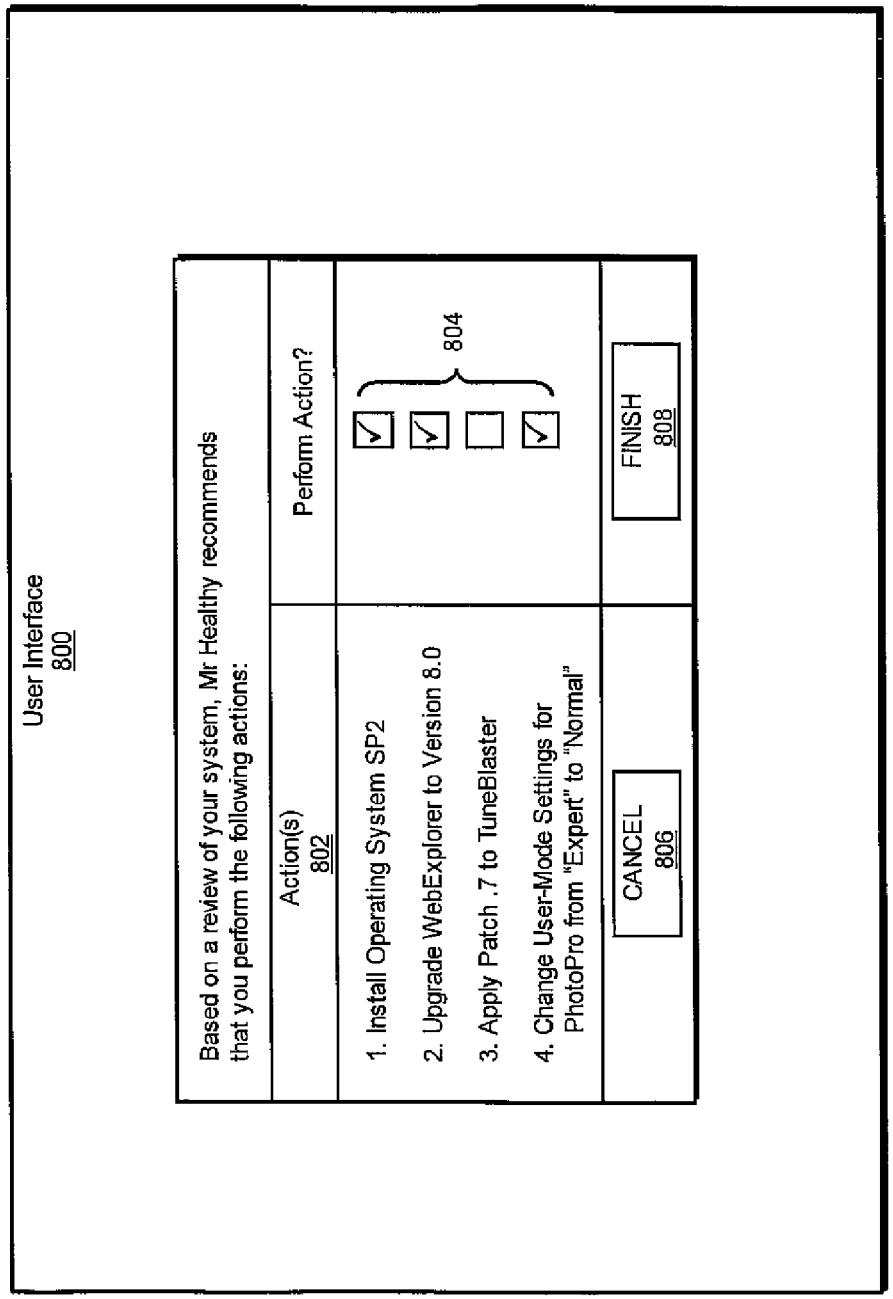
FIG. 8 is a block diagram of an exemplary user interface for providing access to information that provides guidance on the potential impact of a software change on the health of a computing system according to at least one embodiment.

FIG. 8 is an illustration of an exemplary user interface 800 for providing recommendations on software changes to a user. As illustrated in this figure, user interface 800 may display one or more recommended actions 802 to a user. In the example illustrated in FIG. 8, user interface 800 may display the following recommended actions to a user: 1) install Service Pack 2 for the operating system installed on the user's computing device, 2) upgrade the program "WebExplorer 7.2" to version 8.0, 3) apply patch 0.7 to the program "TuneBlaster," 4) change the user mode for the application "PhotoPro" from "Expert" to "Normal." After reviewing the recommended actions 802 displayed by user interface 800, a user may allow one or more of the suggested software changes to occur by selecting one or more of user-selectable boxes 804 and then selecting user-selectable object 808. Alternatively, if the user wishes to prevent each of the recommended actions 802 from occurring on the computing system, then the user may select user-selectable object 806.

User interface 800 in FIG. 8 generally represents any type or form of user interface. Examples of user interface 800 include, without limitation, a graphical user interface executed by a client-side computing device, such as first client 202 in FIG. 2, a website hosted by server-side computing device, such as server 210 in FIG. 2, or any other suitable user interface. In addition, recommendations may be provided by a local computing system, such as clients 202-206 in FIG. 2 and/or exemplary computing system 1010 in FIG. 10, or a remote computing system, such as server 210 in FIG. 2 and/or portions of exemplary network architecture 1100 in FIG. 11. For example, a local system, such as clients 202-206 in FIG. 2, may determine whether to recommend a software change by analyzing the health-impact information received from the server in step 706 in FIG. 7. Alternatively, a remote computing system, such as server 210 in FIG. 2, may determine whether to recommend a software change based on health-impact information received from additional computing systems on which the software change has occurred.

In at least one embodiment, the request transmitted in step 704 may comprise a profile of the computing system. As detailed above, this profile may identify one or more software and/or hardware characteristics of the computing system. In this example, a recommendation of whether to allow the software change to occur may be based at least in part on at least one characteristic of the profile of the computing system. For example, impact-determination module 110 in FIG. 1 may recommend against installing a specific service pack for an operating system installed on the computing device if the service pack is known to cause stability or performance issues with a specific application installed on the computing device. Similarly, impact-determination module 110 may recommend that a user upgrade a specific application (such as WebExplorer 7.2) installed on the user's computing system to a more stable version (such as WebExplorer 8.0).

In an additional embodiment, step 708 in FIG. 7 may be automatically performed by a module, such as impact-determination module 110 in FIG. 1, residing on a user's computing device, such as first client 202 in FIG. 2. In this embodiment, impact-determination module 110 in FIG. 1 may determine whether the health-impact information received from the server in step 706 satisfies predetermined criteria. For example, impact-determination module 110 may determine whether a health-impact score for the software change received from server 210 in FIG. 2 exceeds a predetermined threshold, such as 50%. If the health-impact score is less then this predetermined threshold, then impact-determination module 110 may prevent the software change from occurring on the computing system. However, if the health-impact score for the software change exceeds this predetermined threshold, then impact-determination module 110 may allow the software change to occur on the computing system.

Figure 9:
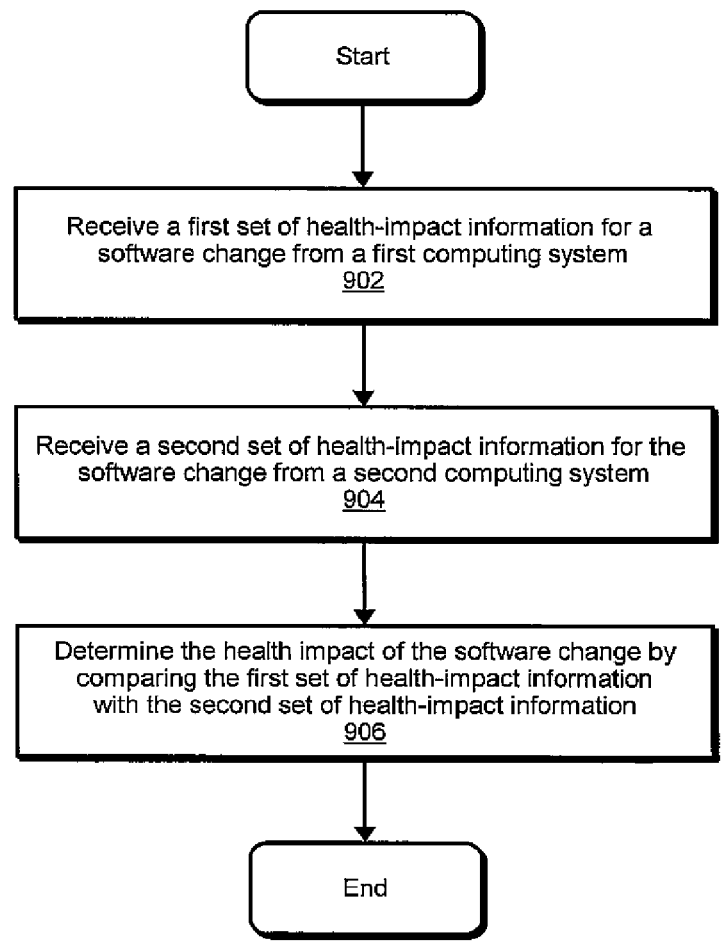
FIG. 9 is a flow diagram of an exemplary computer-implemented method for determining the health impact of a software change based on information obtained from a plurality of computing systems.

As detailed above, exemplary system 100 in FIG. 1 may be used to determine the health impact of a software change based on information obtained from a plurality of computing systems (potentially millions) on which the software change has previously occurred. FIG. 9 is a flow diagram of an exemplary computer-implemented method 900 for determining the health impact of a software change based on information gathered from a plurality of computing system on which the software change has previously occurred. As illustrated in this figure, at step 902 a first set of health-impact information for a software change may be received from a first computing system. For example, as illustrated in FIG. 2, server 210 may receive a first set of health-impact information for a software change that occurred on first client 202 from first client 202 via network 908. As detailed above, the phrase "health-impact information" generally refers to any type or form of information that may be used to determine the impact of a software change on the health of the computing system and/or an application installed on the computing system. Examples of health-impact information that may be received from client-side computing devices include, without limitation, the result of one or more health evaluations, health-impact scores, system profiles, and any other potentially useful information. In at least one embodiment, health-impact information may also include a unique identifier for a software change.

At step 904, a second set of health-impact information for the same software change may be received from a second computing system. For example, server 210 in FIG. 2 may receive health-impact information for the same software change detailed in step 902 from second client 204 via network 208. For example, server 210 may receive health-impact information from second client 204 that identifies the health impact of an operating-system service pack on second client 204.

At step 906, the health impact of the software change may be determined by comparing the first set of health-impact information received from first client 202 with the second set of health-impact information received from second client 204. The impact of a software change on a plurality of computing systems may be determined in a variety of ways. In one example, the health impact of a software change on a plurality of computing systems may be determined by calculating a health-impact score for the software change by comparing the second set of health-impact information received from the second computing system with the first set of health-impact information received from the first computing system.

For example, server 210 in FIG. 2 may calculate one or more health-impact scores for a software change that occurred on first client 202 by comparing the results of a plurality of health evaluations (such as first and second health evaluations 400 and 420 in FIG. 4) received from first client 202. Server 210 in FIG. 2 may then calculate one or more health-impact scores for an identical software change that occurred on second client 204 by comparing the results of a plurality of health evaluations received from second client 204. Server 210 may then calculate an overall health-impact score for the software change by averaging the health-impact scores derived from the health-impact information received from first client 202 and second client 204.

As detailed above, health-impact scores for a software change may also be calculated by a local computing system, such as first client 202 and second client 204 in FIG. 2. In this embodiment, server 210 in FIG. 10 may receive health-impact scores for a common software change (such as a service pack for an operating system) from both first client 202 and second client 204 via network 208. In this example, server 210 may then calculate an overall health-impact score for the software change by averaging the health-impact scores received from first client 202 and second client 204. Upon completion of step 906 in FIG. 9, exemplary method 900 may terminate.

In certain embodiments, the impact score or scores for a software change that are calculated by a local system or a remote system may also be normalized. The terms "normalized" and "normalization," as used herein, generally refer to a division of multiple sets of data by a common variable in order to negate that variable's effect of the data. As will be explained in greater detail below, in at least one embodiment this normalization process may allow impact-health scores obtained from a plurality of systems, each of which may have particular characteristics that vary from the characteristics of other systems (such as processors fees, memory mounts, and the like), to be accurately compared.

Health-impact scores may be normalized using any feasible normalization method. For example, the average CPU-usage-impact score for a software change (such as the average CPU-usage-impact score contained in performance-impact table 446 in FIG. 4) may be normalized by dividing the average CPU impact score by the processor speed of the system, resulting in a per-MHz CPU-usage-impact score. Health-impact scores may be normalized by a remote system, such as server 210 in FIG. 2, or by a local system, such as clients 202-206 in FIG. 2, prior to transmitting this information to the server. In at least one embodiment, the health-impact scores calculated in step 906 in a database, such as impact-scores database 126 in FIG. 1. In certain embodiments, a unique identifier associated with the software change may also be stored with the health-impact score for the software change in the database.

As detailed above, in certain embodiments the heath-impact information received by the server from the computing systems in step 902 and 904 may comprise profiles of the respective computing systems. In this example, the heath-impact information and profiles received from the first and second computing systems may be compared to determine whether the software change is incompatible with application software or system software installed on one or more of the computing systems. For example, if heath-impact information received from the first computing system and the second computing system indicate that a certain software change (such as a service pack for an operating system) only negatively impacts a single application installed on both the first computing system and the second computing system (such as version 11.2 of the application WordEdit), then impact-determination module 110 may determine that this specific service pack is incompatible with version 11.2 of the application WordEdit. In at least one embodiment, compatibility issues identified by impact-determination module 110 may be stored in a database, such as compatibility-issues database 128 in FIG. 1.

As detailed above, the phrase "software change" may refer to settings changes made to application software or system software. In this example, the health impact of a settings change may be determined in step 906 by comparing a first set of heath-impact information for the settings change received from a first computing system in step 902 with a second set of heath-impact information for the settings change received from a second computing system in step 904. This information may then be used to create an optimum-settings database, such as optimum-settings database 130 in FIG. 1, that identifies application-software or system-software settings for computing systems having specific hardware and software profiles that result in improved performance or stability. In certain embodiments, the information contained in optimum-settings database 130 may be used by exemplary system 100 to provide guidance on the potential health impact of software changes and/or to recommend that users apply or avoid certain application-software or system-software settings.

Although not illustrated, in certain embodiments exemplary method 900 may also comprise receiving a request from a third computing system for a heath-impact score for a software change. For example, server 210 in FIG. 2 may receive a request from third client 206 via network 208 for a heath-impact score for a software change (such as a service pack). In at least one embodiment, a request received from this third system may contain a unique identifier associated with the software change (such as the name of a service pack). In response to this request, server 210 in FIG. 2 may transmit the health impact score for the software change to third client 206. As detailed above in connection with FIG. 7, third client 206 may then determine whether to allow the software change to occur based on the heath-impact score received from server 210.

In an additional embodiment, after step 906 in FIG. 9, a request from a third system for heath-impact information for the software change may be received. In at least one embodiment, this request may comprise a profile of the third computing system. For example, server 210 in FIG. 2 may receive a request from third client 206 that contains a profile of third client 206 and requests heath-impact information for the software change identified in steps 902-906 in FIG. 9. Upon receiving this request, server 210 in FIG. 2 may determine the potential impact of the software change on third client 206 by comparing the first set of heath-impact information received from first client 202 in step 902, the second set of heath-impact information received from second client 204 in step 904, and the profile of third client 206. For example, impact-determination module 110 in FIG. 1 may, by comparing this information, determine whether the software change is incompatible with application software or system software installed on third client 206.

Upon determining the potential impact of the software change on third client 206, server 210 may transmit a reply to third client 206 that contains a recommendation on whether to allow the software change to occur on third client 206. As detailed above, in at least one embodiment this recommendation may be based at least in part on at least one characteristic of the profile of third client 206. For example, this recommendation may recommend against installing a specific service pack on third client 206 due to compatibility issues with one or more applications installed on third client 206.

Figure 10:
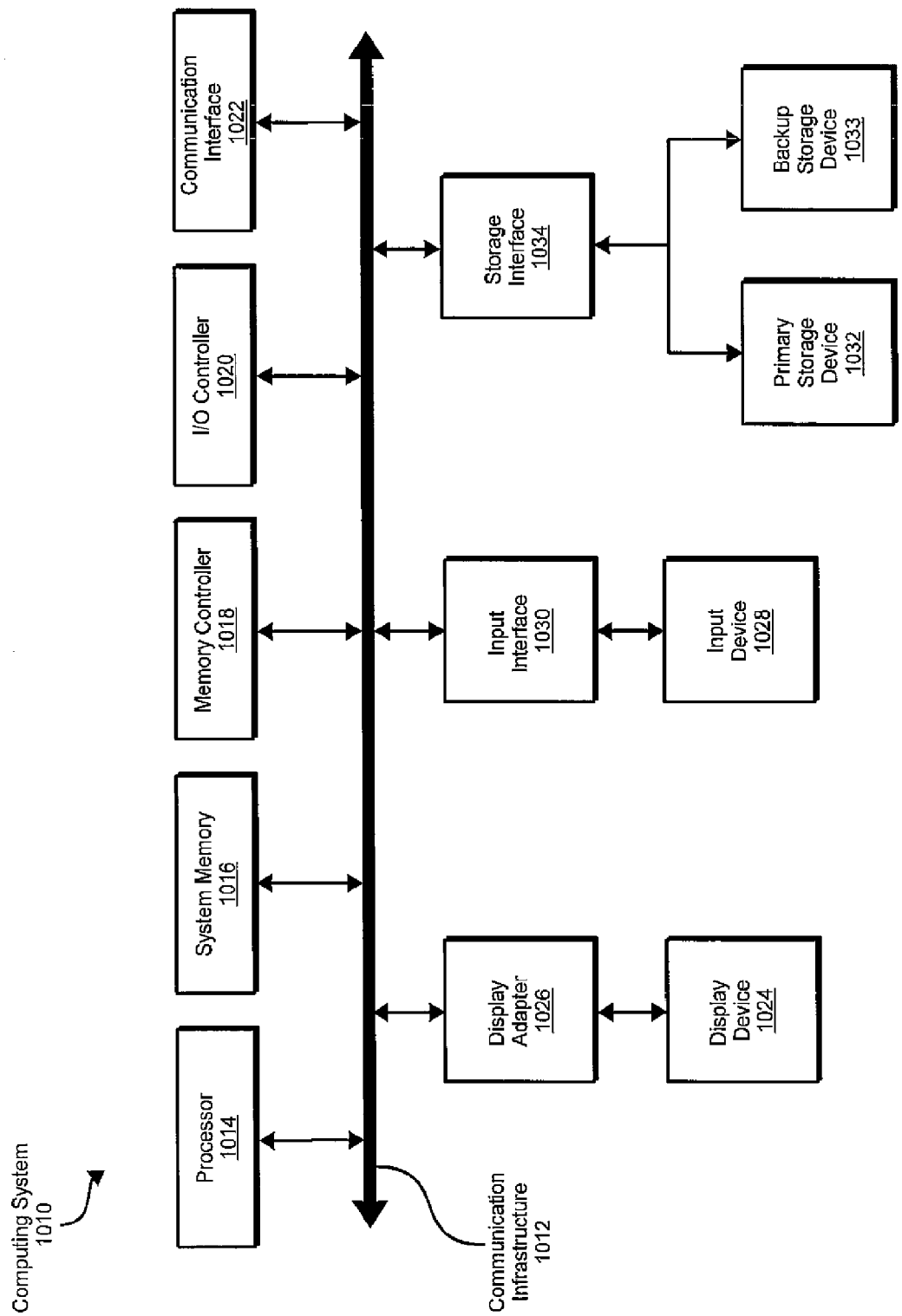
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the identifying, performing, determining, comparing, evaluating, calculating, transmitting, creating, receiving, providing, prompting, allowing, and preventing steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 10, computing system 1010 may comprise a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as identifying, performing, determining, comparing, evaluating, calculating, transmitting, creating, receiving, providing, prompting, allowing, and preventing.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the identifying, performing, determining, comparing, evaluating, calculating, transmitting, creating, receiving, providing, prompting, allowing, and preventing steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the identifying, performing, determining, comparing, evaluating, calculating, transmitting, creating, receiving, providing, prompting, allowing, and preventing steps disclosed herein. Communication interface 1022 may also be used to perform and/or be a means for performing other steps and features set forth in the instant disclosure.

As illustrated in FIG. 10, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the identifying, performing, determining, comparing, evaluating, calculating, transmitting, creating, receiving, providing, prompting, allowing, and preventing steps disclosed herein. Input device 1028 may also be used to perform and/or be a means for performing other steps and features set forth in the instant disclosure.

As illustrated in FIG. 10, exemplary computing system 1010 may also comprise a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the identifying, performing, determining, comparing, evaluating, calculating, transmitting, creating, receiving, providing, prompting, allowing, and preventing steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments descried and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1190(1)-(N) generally represent any type or form of storage device or medium capable of storing data and/or other computer-readable instructions. In certain embodiments, storage devices 1160(1)-(N) and storage devices 1190(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the identifying, performing, determining, comparing, evaluating, calculating, transmitting, creating, receiving, providing, prompting, allowing, and preventing steps disclosed herein. Network architecture 1100 may also be used to perform and/or be a means for performing other steps and features set forth in the instant disclosure.

As detailed above, computing system 1010 and/or one or more of the components of network architecture 1100 may perform and/or be a means for performing either alone or in combination with other elements, one or more steps of the exemplary methods described and/or illustrated herein. For example, a computer-implemented method for determining the health impact of a software change may comprise identifying the software change, performing a first health evaluation, allowing the software change to occur, performing a second health evaluation, and determining the impact of the new application by comparing the results of the second health evaluation with the results of the first health evaluation.

In certain embodiments, the application-software change may comprise an application upgrade, an application patch, or an application-settings change. Similarly, the system-software change may comprise an operating-system upgrade, an operating-system patch, or an operating-system-settings change.

In at least one embodiment, determining the impact of the software change may comprise calculating a health-impact score for the software change by comparing the results of the second health evaluation with the results of the first health evaluation. In an additional embodiment, the method may further comprise, prior to comparing the results of the second health evaluation with the results of the first health evaluation, transmitting the results of both the first health evaluation and the second health evaluation to a server, which may then determine the impact of the software change by comparing the results of the second health evaluation with the results of the first health evaluation. In an additional embodiment, the method may further comprise creating a profile of the computing system and then transmitting the profile of the computing system to the server.

In certain embodiments, performing the first health evaluation may comprise creating a first performance index based on at least one performance metric and/or a first stability index based on at least one stability metric. Similarly, performing the second health evaluation may comprise creating a second performance index based on at least one performance metric and/or a second stability index based on at least one stability metric. In addition, comparing the second health evaluation with the first health evaluation may comprise comparing the second performance index with the first performance index and/or comparing the second stability index with the first stability index.

In certain embodiments, the software change may be identified and/or the first evaluation performed before the software change occurs on the computing system. The method may also comprise identifying a second software change and performing the second evaluation of the health of the computing system before the second software change occurs on the computing system.

In an additional embodiment, a computer-implemented method for providing guidance on the potential health impact of a software change may comprise identifying the software change, obtaining health-impact information for the software change that identifies the potential health impact of the software change, and determining, based on the health-impact information for the software change, whether to allow the software change to occur.

In additional embodiments, determining whether to allow the software change to occur may comprise providing a recommendation on whether to allow the software change to occur to a user, and then prompting the user to allow or deny the software change. The recommendation may comprise a recommendation to prevent the software change from occurring, a recommendation to allow the software change to occur, or a recommendation to allow the software change to occur conditioned upon the occurrence of an additional software change. In addition, the recommendation may comprise creating a profile of the computing system. In this example, the recommendation on whether to allow the software change to occur may be based at least in part on at least one characteristic of the profile of the computing system.

In certain embodiments, determining whether to allow the software change to occur may comprise determining whether the health-impact information satisfies predetermined criteria, allowing the software change to occur if the health impact information satisfies the predetermined criteria, and preventing the software change from occurring if the health-impact information fails to satisfy the predetermined criteria.

In an additional embodiment, a computer-implemented method for determining the health impact of a software change based on information obtained from a plurality of computing systems may comprise receiving a first set of health-impact information for a software change from a first computing system, receiving a second set of health-impact information for the software change from a second computing system, and then determining the health impact of the software change by comparing the first set of health-impact information with the second set of health-impact information.

In certain embodiments, the first and second sets of health-impact information may comprise profiles of the first and second computing systems, respectively. In this example, determining the health impact of the software change may comprise determining, by comparing at least the first set of health-impact information with the second set of health-impact information, whether the software change is incompatible with application software or system software installed on the first computing system or the second computing system.

In additional embodiments, determining the health impact of the software change may comprise calculating a health-impact score for the software change by comparing the second set of health-impact information with the first set of health-impact information. In addition, determining the health impact of the software change for a third computing system may comprise receiving a request from the third computing system for the health-impact score for the software change and then transmitting the health-impact score for the software change to the third computing system.

In certain embodiments, the request received from the third computing system may comprise a profile of the third computing system. In this example, determining the health impact of the software change may comprise comparing at least the first set of health-impact information, the second set of health-impact information, and the profile of the third computing system and then transmitting a reply to the third computing system that contains a recommendation on whether to allow the software change to occur on the third computing system. In this embodiment, the recommendation may be based at least in part on at least one characteristic of the profile of the third computing system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing guidance on the potential health impact of mobile software changes, the method comprising:
   identifying, at a mobile computing device comprising at least one processor, a mobile software change, the mobile software change comprising at least one of:
     a change to mobile application software;
     a change to mobile system software;
   requesting, at the mobile computing device, health-impact information for the mobile software change from a server;
   receiving, at the mobile computing device, the health-impact information for the mobile software change from the server, wherein the health-impact information received from the server identifies a potential impact of the mobile software change on the health of the mobile computing device and is based at least in part on an analysis of information obtained from at least one additional mobile computing device on which the mobile software change previously occurred;
   determining, at the mobile computing device based on the health-impact information received from the server, whether to allow the mobile software change to occur on the mobile computing device.

2. The method of 1, wherein determining whether to allow the mobile software change to occur comprises:
   providing a recommendation on whether to allow the mobile software change to occur to a user of the mobile computing device;
   after providing the recommendation to the user, prompting the user to allow or deny the mobile software change.

3. The method of claim 2, wherein the recommendation comprises at least one of:
- a recommendation to prevent the mobile software change from occurring;
- a recommendation to allow the mobile software change to occur;
- a recommendation to allow the mobile software change to occur conditioned upon the occurrence of an additional mobile software change.

4. The method of claim 2, wherein the recommendation on whether to allow the mobile software change to occur is based at least in part on at least one characteristic of a profile of the mobile computing device.

5. The method of claim 2, wherein providing the recommendation comprises generating, at the mobile computing device, the recommendation based at least in part on the health-impact information received from the server.

6. The method of claim 1, wherein determining whether to allow the mobile software change to occur comprises at least one of:
- determining whether the health-impact information satisfies predetermined criteria;
- allowing the mobile software change to occur if the health-impact information satisfies the predetermined criteria;
- preventing the mobile software change from occurring if the health-impact information fails to satisfy the predetermined criteria.

7. The method of claim 1, wherein identifying the mobile software change comprises identifying the mobile software change before the mobile software change occurs on the mobile computing device.

8. The method of claim 1, wherein:
- the change to the mobile application software comprises at least one of:
  - an upgrade for a mobile application;
  - a patch for a mobile application;
  - a settings change for a mobile application;
- the change to the mobile system software comprises at least one of:
  - an upgrade for a mobile operating system;
  - a patch for a mobile operating system;
  - a settings change for a mobile operating system.

9. The method of claim 1, wherein the health-impact information received from the server comprises a recommendation on whether to allow the mobile software change to occur on the mobile computing device.

10. A computer-implemented method for determining the health impact of mobile software changes based on information obtained from mobile computing devices, the method comprising:
- receiving, at a server, health-impact information for a mobile software change from a plurality of mobile computing devices, wherein the health-impact information identifies, for each mobile computing device within the plurality of mobile computing devices, an impact of the mobile software change on the health of the mobile computing device, the mobile software change comprising at least one of:
  - a change to mobile application software;
  - a change to mobile system software;
- receiving, at the server, a request from at least one additional mobile computing device for information that identifies a potential impact of the mobile software change on the health of the additional mobile computing device;
- determining, by analyzing the health-impact information received from the plurality of mobile computing devices, the potential impact of the mobile software change on the health of the additional mobile computing device;
- transmitting, from the server to the additional mobile computing device, information that identifies the potential impact of the mobile software change on the health of the additional mobile computing device to enable the additional mobile computing device to determine whether to allow the mobile software change to occur on the additional mobile computing device.

11. The method of claim 10, wherein the health-impact information received from each mobile computing device within the plurality of mobile computing devices comprises at least one of:
- a profile of the mobile computing device in question;
- a unique identifier that uniquely identifies the mobile software change;
- results of at least one evaluation of the health of the mobile computing device in question;
- results of at least one evaluation of the health of at least one mobile application installed on the mobile computing device in question;
- a health-impact score for the mobile software change.

12. The method of claim 10, further comprising calculating an overall health-impact score for the mobile software change based at least in part on the analysis of the health-impact information received from the plurality of mobile computing devices.

13. The method of claim 12, wherein transmitting, from the server to the additional mobile computing device, information that identifies the potential impact of the mobile software change on the health of the additional mobile computing device comprises transmitting the overall health-impact score for the mobile software change from the server to the additional mobile computing device.

14. The method of claim 10, wherein:
- the request received from the additional mobile computing device comprises a profile of the additional mobile computing device;
- the potential impact of the mobile software change on the health of the additional mobile computing device is determined based at least in part on at least one characteristic of the profile of the additional mobile computing device;
- the information that identifies the potential impact of the mobile software change comprises a recommendation on whether to allow the mobile software change to occur on the additional mobile computing device, the recommendation being based at least in part on at least one characteristic of the profile of the additional mobile computing device.

15. The method of claim 10, further comprising determining whether the mobile software change is incompatible with mobile application software or mobile system software installed on one or more mobile computing devices within the plurality of mobile computing devices.

16. The method of claim 10, further comprising determining, for each mobile computing device within the plurality of mobile computing devices, whether the mobile software change impacted the health of the mobile computing device at least in part by:
- identifying a baseline health evaluation performed by the mobile computing device;
- comparing the baseline health evaluation with at least one additional health evaluation performed by the mobile computing device after the mobile software change occurred on the mobile computing device in order to determine whether the mobile software change impacted the health of the mobile computing device.

17. The method of claim 16, wherein at least one of:
the mobile computing device performed the baseline health evaluation before the mobile software change occurred on the mobile computing device;
the mobile computing device performed the baseline health evaluation immediately after the mobile software change occurred on the mobile computing device;
the mobile computing device performed the additional health evaluation before any additional mobile software changes occurred on the mobile computing device.

18. The method of claim 17, wherein each evaluation involves creating at least one of:
at least one performance index based on at least one performance metric;
at least one stability index based on at least one stability metric.

* * * * *